Patented Nov. 12, 1935

2,020,311

UNITED STATES PATENT OFFICE 2,020,311

THERMOPLASTIC COMPOSITION AND METHOD OF MAKING THE SAME

Laurence E. Harrison, Long Beach, Calif., assignor to Oramold Products Corporation, West Hollywood, Calif., a corporation of Nevada No Drawing. Application September 11, 1933, Serial No. 688,984

26 Claims. (Cl. 18—47)

This invention relates to thermoplastic molding materials and particularly to a composition of matter containing metallic and alkaline earth metal soaps, alone or in conjunction with one or more other ingredients, and suitable for use as a thermoplastic composition or for other purposes. The invention also relates to a method of compounding the ingredients entering into the composition.

This application is a continuation-in-part of my copending application Ser. No. 599,069, filed March 15, 1932.

Although metallic and alkaline earth metal soaps of fatty acids have numerous highly desirable properties, difficulty has been experienced in their use because of the peculiar characteristics of these soaps. For example, the metallic soaps of oleic, stearic, palmitic and linoleic acids, such as the aluminum, zinc and lead soaps, are good waterproofing and plasticizing agents but because they are substantially insoluble in water, their sphere of usefulness is quite limited. Certain of these soaps, such as, for example, aluminum stearate, are so light and fluffy that it is difficult to incorporate the soaps in a final composition.

It is an object of this invention to disclose and provide a vehicle whereby it is possible to incorporate metallic and alkaline earth metal soaps of fatty acids into numerous compositions to utilize these soaps for a variety of purposes hitherto thought impossible.

An object of this invention is to disclose and provide a thermoplastic composition containing substantially water-insoluble soaps which can be incorporated readily into aqueous media or masses containing appreciable amounts of moisture.

A still further object of this invention is to disclose and provide, according to one embodiment, a composition of matter which exhibits plastic flow when subjected to pressure, but which will not adhere to moist surfaces and which is remarkably elastic, thereby being particularly adapted for use as a molding composition for dental work.

A still further object of this invention, according to one embodiment, is to disclose and provide a composition of matter capable of being used in the taking of castings from the oral cavity, said composition being capable of being used without sticking or discomfort to the oral cavities and without dehydrating, cracking or shrinking upon standing for a reasonable length of time.

An object of this invention is to disclose and provide a suitable method of combining the ingredients in the production of the vehicle and of the thermoplastic compositions embraced by this invention.

As has been stated hereinbefore, one of the objects of this invention is to disclose and provide a method and means of utilizing substantially water-insoluble metallic and alkaline earth soaps in thermoplastic compositions.

A further object of the invention is to provide a thermoplastic composition of matter which may be advantageously combined with other thermoplastic materials and incorporated in an aqueous gel-forming material to produce a plastic molding or impression material of advantageous properties.

It has been found that a mixture or composition containing a triethanolamine soap and a metallic or alkaline earth metal water-insoluble soap of a fatty acid, has a number of distinguishing characteristics. For example, although the composition contains a substantially water-insoluble and water-repellent soap, such composition can now be dispersed in an aqueous medium, thereby permitting the dissemination of a water-repellent soap composition throughout an aqueous material.

The metallic or alkaline earth metal water-insoluble soap used in the composition may comprise a fatty acid soap of a metal selected from the group consisting of aluminum, zinc, lead, calcium and magnesium.

The vehicle for these soaps consists essentially of triethanolamine combined with a fatty acid or other soap-forming organic acid, such as palmitic, oleic, linoleic, stearic or abietic acid. Best results have been obtained by the use of stearic or oleic acid. In compounding the vehicle, the triethanolamine and the fatty acid are intimately mixed together, the mass being heated to a suitable temperature as, for example, to a temperature of between 100 and 200° C. Equal parts of triethanolamine and the fatty acid give good results. Preferably, a sufficient amount of free fatty acid (or oil containing the same) is employed to completely saponity with the triethanolamine. The resulting triethanolamine soap is soluble both in water and in oils and for this reason is a very effective vehicle or carrier for the water-repellent soaps.

The metallic or alkaline earth metal soap of the fatty acid is incorporated into the triethanolamine soap at a temperature sufficient to reduce the metallic or alkaline earth metal soap to a fluid condition. Naturally, the temperature of incorporation will vary with the type of soap employed. Generally, temperatures of from 100 to 300° C. are necessary. From 1 to 25 parts of the metallic or alkaline earth metal soap may be added to part of the triethanolamine soap.

The resulting material has the general properties of a thermoplastic, and, upon cooling, appears to consist of a triethanolamine soap intimately combined with a metallic soap. It is waxy and resembles paraffin in appearance. It does not readily become liquid but upon being reheated, assumes a jelly-like consistency before becoming liquid. In other words, the liquefaction point is not particularly sharp but instead an intermediate jelly-like condition is exhibited. Furthermore, the composition has a lower melting point than the metallic soap used therein and the melting point can be regulated by the proportion of triethanolamine used in its manufacture.

The composition consisting of or containing a triethanolamine soap and a metallic or alkaline earth metal substantially water-insoluble soap, described hereinabove, and hereinafter referred to as the "thermoplastic soap mixture", has a number of important uses. For example, it may be used in the compounding of rubber for its softening and plasticizing effect. It eliminates tackiness and facilitates the dispersion of resins, gums, et cetera. It may be used as a stabilizing agent in the dehydration of rubber latex and is extremely useful as a waterproofing agent, particularly when compounded with abietic acid, in cements, lime and plaster. For this purpose, it may be used either alone or with a suitable carrier impregnated with the soap mixture. Suitable carriers for this purpose include wood filler, finely ground pumice, diatomaceous earth, et cetera.

Furthermore, the thermoplastic soap mixture described hereinabove may be used as a cleanser and detergent, particularly when associated with an antiseptic or a very mild abrasive. In medicine, it may be used as a carrier for antiseptics, analgesics, germicides, et cetera, thereby giving rise to highly desirable salves. It may be applied to gauze or it may be used in dental preparations such as tooth pastes or powders. Oil-soluble coloring materials may be incorporated in the mixture and thus carried into aqueous bodies such as tooth pastes, cement mixtures, etc.

The above-described thermoplastic soap mixture may be used in the manufacture of molding compositions of differing physical properties. For example, according to one embodiment of the invention a non-aqueous or substantially non-aqueous composition can be prepared which may be utilized in the preparation of castings of the oral cavity for dental purposes or the like, which is capable of plastic deformation under pressure at body temperature and at the same time quite elastic so that when the mold is removed from the subject it will return to the desired impression shape, making it possible to obtain perfect castings of undercut portions and recesses. Such a composition may be prepared by mixing the thermoplastic soap mixture, or the above-described ingredients thereof, with a resinous or resin-like thermoplastic material, with or without the presence of softening or plasticizing agents such as oils.

The term "thermoplastic material" as used herein will be understood to mean a substance which has the property of repeatedly changing from a non-plastic or solidified state to a plastic or fluent state, and back again upon repeated heating and cooling through a certain temperature range. Examples of suitable resinous or resin-like thermoplastic materials are as follows: resin (colophony), resin ester gums (such as glycerol abietate or glycol abietate), balata, balata-like rubber isomers or other suitable resin-like rubber isomers.

The above-described thermoplastic soap mixture is also useful, according to another embodiment, in the manufacture of aqueous molding compositions, which are not subject to plastic deformation at body temperature and which are quite resilient and elastic. In this latter use the thermoplastic soap mixture may be incorporated in a suitable aqueous solution of a reversible gel-forming hydrocolloid such as an aqueous solution of agar-agar either alone or in conjunction with other thermoplastic materials such as above described, dependent upon the particular properties desired in the final composition.

The reversible gel-forming hydrocolloid may be a suitable material such as agar-agar, and is preferably made into a water suspension or dispersion before adding to the mixture. Other alginic gel-forming materials, such as Irish moss, may be used in some cases, but in general I prefer to use agar-agar, because of its definite setting temperature as a hydro-gel, and its absence of any appreciable tendency to take up additional water after it has once set. In some cases, I may use other reversible gel-forming hydrocolloids, such as gelatin, alone or in conjunction with an alginic substance.

A molding composition of a substantially non-aqueous nature may be prepared from the thermoplastic soap mixture, resin, glycerol or the like and, if desired, resin oil, either with or without suitable filler materials, fibrous materials, and coloring and flavoring materials. For example, 25 parts of resin may be heated with 3 parts of glycerol or glycol to a temperature of between 200° C. and 320° C., preferably about 290° C., and thoroughly agitated until a homogeneous viscous body is obtained which appears to consist principally of a resin ester gum, which is in itself a "thermoplastic". Thereafter, from 15 to 50 parts of the thermoplastic soap mixture is introduced. Before introducing the thermoplastic soap mixture, the temperature of the resin mass is preferably reduced to about 150° C. After the thermoplastic soap mixture has been introduced into the body, from 5 to 10 parts of resin oil may be added, if desired, to increase the plasticity of the mass, the temperature of the mass being increased slightly as, for example, to 175° C. during such addition.

Although the product, above-described, if allowed to cool at this time, would make a suitable thermoplastic material for a number of purposes, it has been found advantageous to slightly modify the composition when it is to be used as a dental impression material. For example, it is desirable to increase the cohesion and resistance to deformation of the material in its heated or softened state so that when it is pressed into contact with the oral cavity all indentations or recesses will be filled with the material and a faithful reproduction obtained. I have found that from about one to five parts of wood flour or a short fibrous pulp may be incorporated in the above mixture, with highly advantageous results. The wood flour used in the composition should be finer than 100 mesh and preferably on the order of 150 to 300 mesh in fineness. For example, two parts of wood flour may be added to the heated mass and thoroughly stirred into the same, maintaining the temperature of the mass in the neighborhood of 125 to 150° C. A small amount of water is then poured upon the batch, gradually, and the batch agitated during cooling. As the temperature of the batch is lowered to the neighborhood of 100° C., from 5 to 10 per cent of water will be taken up by the composition in a relatively stable condition, apparently in the form of small water globules uniformly dispersed through the mass. After the composition has cooled to a temperature sufficiently low to permit handling, it may be passed through rolls and the rolled material then stamped or cut up into cakes or bars.

The material may be used for the making of dental impressions in the conventional manner, for example, by placing a small portion in a suitable container and placing the container in boiling water until the composition is sufficiently softened, the softened composition placed on a suitable tray and allowed to cool to approximately 40° C. and the impression of the desired portion of the oral cavity made. After the composition has been pressed into place about the subject, it may be chilled by the application of cool water and then removed from the mouth.

The plastic composition above-described is eminently adapted as a molding compound. It is elastic, non-adherent to water-wet surfaces, pliable at body temperatures but incapable of plastic deformation at body temperatures unless pressure is applied. Although the composition may contain from 5 to 10% of water, such water is tenaciously retained and bodies molded therefrom will not crack or shrink upon standing a reasonable length of time, and the material may be considered as substantially non-aqueous. The finely disintegrated wood flour renders the molding composition capable of easy flow under pressure when warmed, so that minute depressions, undercut portions, cavities, et cetera, are faithfully reproduced in the mold when the molding material is withdrawn from the oral cavity.

A slightly modified method of manufacturing the composition is as follows: 25 parts of resin are melted or fluxed with 1 to 5 parts of glycerol (depending upon the abietic acid content of the resin), preferably under a reflux condenser, and from 10 to 25 parts of aluminum stearate added to the mixture while it is still at a relatively high temperature, that is, 250° C. or thereabove. From about 5 to 10 parts of resin oil are then added, if desired, and after this has been thoroughly incorporated into the body, it is allowed to cool to a temperature of about 150° C., whereupon from 1 to 5 parts of triethanolamine stearate is added. Thereafter, the wood flour may be incorporated and the mass treated as described hereinabove. Prior to the addition of triethanolamine stearate, the composition, although elastic, is extremely sticky and gummy and unsuited for dental purposes.

In the above embodiment of the invention, it will be appreciated that modifications may be made, such as using resin ester gums in place of the glycerol fluxed resin if desired. Normally, however, a product made from resin, glycerol, triethanolamine stearate and a metallic soap such as aluminum or zinc stearate, together with desired filler and other materials, answers the principal requirements of a non-aqueous dental molding composition.

According to another embodiment of the invention, the above-mentioned thermoplastic soap mixture may be mixed with some other suitable thermoplastic material such as balata, or a balata-like rubber isomer, such as hereinafter described, by milling on a hot rubber mill, instead of mixing the soap mixture with resin or the like. In preparing this composition a suitable quantity of softening agent such as an oleo-resin or resin oil may be incorporated whereby the desired softening and solidification temperatures of the final product modified to the desired degree.

According to another embodiment of the present invention I may dissolve a portion of the above-mentioned thermoplastic soap mixture in benzol or other suitable solvent and disperse the same in an aqueous agar-agar solution under conditions of considerable agitation and at a temperature in the neighborhood of the boiling point of water, heat the mixture to evaporate the solvent and a portion of the water contained in the agar-agar solution to the end that the resulting mixture will contain approximately 10 parts of soap mixture, approximately 6 parts of agar-agar and approximately 25 parts of water. This composition, in common with the other hydrocolloid compositions hereinafter described, is physically different from the non-aqueous compositions above-described and is quite suitable as a dental impression material, being highly resilient and elastic, not subject to plastic deformation under pressure, and capable of reproducing impressions of the oral cavity in faithful detail.

According to another embodiment of the present invention I may dissolve a portion of the above-mentioned resin and thermoplastic soap mixture in a suitable solvent, such as benzol or the like in which the solubility is in the neighborhood of 25%, and incorporate the mixture in a suitable hydrocolloid base. I may take one part of the above resin and soap mixture and prepare a solution thereof in benzol or other suitable volatile solvent and add the same to six parts of a 10 per cent aqueous agar-agar solution under conditions of violent agitation and preferably while maintaining the agitated agar-agar solution at a temperature in the neighborhood of the boiling point of water and at least somewhat above the boiling point of the solvent. The dissolved resin and soap mixture may be added a little at a time, over a relatively long period during which a considerable proportion of the water in the agar-agar solution is evaporated, to the end that the final product will consist of approximately three parts of agar-agar plus water and one part of the resin and soap composition.

If desired, the thermoplastic soap mixture may be mixed with another thermoplastic material, such as balata or, preferably, a balata-like rubber isomer of the type disclosed in U. S. Patent No. 1,605,180 issued to H. L. Fisher and then mixed with the desired hydrocolloid. In this use I prefer to thoroughly inter-mix the balata-like rubber isomer (or other desirable thermoplastic) with the thermoplastic soap mixture and subsequently dissolve the mixed composition in a suitable solvent such as benzol and incorporate the same in a hydrocolloid base after the manner above-described. For example, I may take 10 parts of a rubber isomer of the type referred to in the above-mentioned Fisher patent under Examples 2 or 3, and 25 parts of thermoplastic soap mixture, mill the same on a hot rubber mill or other suitable milling means until the above materials are thoroughly inter-incorporated. I may then take one part of the resulting thermoplastic composition and dissolve it with benzol and add the benzol solution to six parts of a 10 per cent aqueous agar-agar solution under such conditions as are above-described, so that the resulting product will contain approximately 25 per cent of the thermoplastic mixture.

It is to be understood that although specific ingredients and proportions have been mentioned hereinabove, the invention is not limited thereto but contemplates all such deviations and modifications as would occur to those skilled in the art. Whenever reference has been made to "triethanolamine", the commercial product is meant, such commercial product containing diethanolamine and monoethanolamine in varying quantities. Although aluminum stearate has been mentioned specifically in the illustrated examples given hereinabove, the aluminum, zinc, and lead soaps of oleic, stearic, palmitic and linoleic acids can be successfully employed. Calcium and magnesium soaps may also be used. Furthermore, it will be understood that various types of thermoplastic resins may be combined with the thermoplastic soap mixture to produce a thermoplastic molding composition, either in combination with an aqueous hydrocolloid solution or alone as desired. The thermoplastic soap composition, modified or not by the presence of added thermoplastics, lends its desirable thermoplastic properties to any composition in which it forms an ingredient, and it will be appreciated that variation in the quantity of such mixture in a composition will provide advantageous control of the physical properties thereof.

It is to be understood that in addition to the ingredients stated, other filler, coloring, flavoring and/or scenting materials may be added to any of the above compositions. For example, it has been found advantageous in certain cases to introduce zinc oxide, iron oxide and other finely divided materials of similar characteristics into the compositions to impart desired colors thereto. Oil-soluble dyes may also be added. Furthermore, suitable plaster-hardening agents such as alum, potassium sulphate, or the like may be added to the compositions, if desired.

I claim:

1. A thermoplastic composition of matter comprising a triethanolamine soap having a substantially water-insoluble metallic soap incorporated therein.

2. A thermoplastic composition of matter comprising a triethanolamine soap and aluminum stearate incorporated therein.

3. A thermoplastic molding composition comprising a triethanolamine soap, a substantially water-insoluble soap of a metal or alkaline earth metal, and a thermoplastic resinous or resin-like substance.

4. A thermoplastic molding composition comprising a triethanolamine soap, a substantially water-insoluble soap from the group consisting of the aluminum, zinc, lead, calcium and magnesium soaps of a soap-forming organic acid, and a thermoplastic material from the group consisting of resins, resin ester gums, balata and resin-like rubber isomers.

5. A thermoplastic molding composition comprising a resin ester gum, a triethanolamine soap and a substantially water-insoluble soap from the group consisting of soaps of aluminum, zinc, lead, calcium and magnesium.

6. A thermoplastic molding composition comprising a balata-like rubber isomer, a triethanolamine soap and a substantially water-insoluble soap from the group consisting of soaps of aluminum, zinc, lead, calcium and magnesium.

7. A thermoplastic molding composition comprising a resin ester gum fluxed with resin oil, and containing a triethanolamine soap, a substantially water-insoluble soap from the group consisting of aluminum, zinc, lead, calcium and magnesium soaps of fatty acids and abietic acid, and a finely divided wood flour.

8. A thermoplastic non-sticky composition capable of exhibiting plastic flow at body temperatures when under pressure, comprising a resin base containing a triethanolamine soap and a substantially water-insoluble metallic soap dispersed therein.

9. A thermoplastic molding composition containing approximately 25 parts of resin fluxed with 1 to 5 parts of glycerol, 10 to 25 parts of aluminum stearate and 5 to 10 parts of resin oil, and containing 1 to 5 parts of triethanolamine stearate.

10. A thermoplastic molding composition containing approximately 25 parts of resin fluxed with 1 to 5 parts of glycerol, 10 to 25 parts of aluminum stearate and 5 to 10 parts of resin oil, and containing 1 to 5 parts of triethanolamine stearate and 1 to 5 parts of wood flour.

11. A thermoplastic molding composition comprising a mixture of triethanolamine soap and a substantially water-insoluble soap from the group consisting of soaps of aluminum, zinc, lead, calcium and magnesium, and an aqueous hydrocolloid, said mixture being dispersed in said aqueous hydrocolloid.

12. A thermoplastic molding composition comprising: a mixture of a triethanolamine soap, a substantially water-insoluble soap from the group consisting of soaps of aluminum, zinc, lead, calcium and magnesium, and a thermoplastic material from the group consisting of resin, resin ester gums, balata, and resin-like rubber isomers; and an aqueous hydrocolloid, said mixture being dispersed in said aqueous hydrocolloid.

13. A thermoplastic molding composition comprising: a mixture of triethanolamine soap, a substantially water-insoluble soap from the group consisting of soaps of aluminum, zinc, lead, calcium and magnesium; and an aqueous hydrocolloid, said mixture being dispersed in said aqueous hydrocolloid.

14. A thermoplastic molding composition comprising: a mixture of triethanolamine soap, a substantially water-insoluble soap from the group consisting of soaps of aluminum, zinc, lead, calcium and magnesium, and a balata-like rubber isomer; and an aqueous hydrocolloid, said mixture being dispersed in said aqueous hydrocolloid.

15. A thermoplastic molding composition comprising an aqueous hydrocolloid containing approximately 25% of a mixture of a triethanolamine soap and a substantially water-insoluble soap from the group consisting of soaps of aluminum, zinc, lead, calcium and magnesium, said mixture being dispersed in said hydrocolloid.

16. A thermoplastic molding composition comprising: an aqueous hydrocolloid containing approximately 25% of a mixture of triethanolamine soap, a substantially water-insoluble soap from the group consisting of soaps of aluminum, zinc, lead, calcium and magnesium, and a thermoplastic material selected from the group consisting of resins and resin-like rubber isomers, said mixture being dispersed in said hydrocolloid.

17. A thermoplastic molding composition comprising: an aqueous hydrocolloid containing approximately 25% of a mixture of triethanolamine soap, a substantially water-insoluble soap from the group consisting of soaps of aluminum, zinc, lead, calcium and magnesium, said mixture being dispersed in said hydrocolloid.

18. A thermoplastic molding composition comprising an aqueous hydrocolloid containing approximately 25% of a mixture of triethanolamine soap, a substantially water-insoluble soap from the group consisting of soaps of aluminum, zinc, lead, calcium and magnesium, and a balata-like rubber isomer, said mixture being dispersed in said hydrocolloid.

19. A thermoplastic molding composition comprising: an aqueous hydrocolloid containing approximately 25% of a mixture of triethanolamine soap, a substantially water-insoluble soap from the group consisting of soaps of aluminum, zinc, lead, calcium and magnesium, and resin, said mixture being compounded in the following proportions: a triethanolamine soap, 1 to 5 parts; a metal soap from the group set forth, 10 to 25 parts; and resin, 25 parts.

20. A thermoplastic molding composition comprising an aqueous hydrocolloid containing approximately 25% of a mixture of triethanolamine soap, a substantially water-insoluble soap from the group consisting of soaps of aluminum, zinc, lead, calcium and magnesium, and a balata-like rubber isomer, said mixture being compounded in the following proportions; a triethanolamine soap, 10 to 15 parts; a metal soap selected from the group above set forth, 10 to 25 parts; and a balata-like rubber isomer, 10 parts.

21. A method of compounding a thermoplastic composition which comprises fluxing a resin with glycerol at a temperature of between 200° C. and 320° C., lowering the temperature of the fluxed mixture to about 150° C., and incorporating into said fluxed resin while at said lowered temperature, a substantially water-insoluble soap and a triethanolamine soap.

22. A method of compounding a thermoplastic composition which comprises fluxing a resin with glycerol at a temperature of between 200° C. and 320° C., lowering the temperature of the fluxed mixture to about 150° C., incorporating a substantially water-insoluble soap into said fluxed resin while at said lowered temperature, then dispersing a triethanolamine soap of a fatty acid into said mixture, and finally adding wood flour to said mixture while at a temperature above 100° C.

23. A method of compounding a thermoplastic molding composition which comprises fluxing a resin with glycerol at a temperature of between 200° C. and 320° C., lowering the temperature of the fluxed mixture to about 150° C., incorporating a substantially water-insoluble metallic soap into said fluxed resin while at said lowered temperature, dispersing a triethanolamine soap of a fatty acid into said mixture, adding wood flour to said mixture while at a temperature above 100° C., and then cooling the mixture in the presence of added water.

24. A method of compounding a molding composition which comprises milling a balata-like rubber isomer with a mixture of triethanolamine soap and a soap from the group consisting of soaps of aluminum, zinc, lead, calcium and magnesium, dissolving the resulting mixture in a volatile solvent and adding the resulting solution to an aqueous solution of a hydrocolloid under conditions of violent agitation and at a temperature in the neighborhood of the boiling point of water.

25. A method of compounding a molding composition which comprises milling a balata-like rubber isomer with a mixture of triethanolamine soap and a soap from the group consisting of soaps of aluminum, zinc, lead, calcium and magnesium, dissolving the resulting mixture in a volatile solvent and adding the resulting solution to an aqueous solution of hydrocolloid under conditions of violent agitation, and heating the hydrocolloid solution to evaporate a portion of the water contained therein so that the resulting composition contains approximately 25% of said milled mixture.

26. A method of compounding a thermoplastic molding composition which comprises fluxing a resin with glycerine at a temperature of between 200° C. and 320° C., lowering the temperature of the fluxed mixture to about 150° C., incorporating a substantially water-insoluble metallic soap into said fluxed resin while at said lowered temperature, then incorporating a triethanolamine soap of a fatty acid into said mixture, allowing said mixture to cool, dissolving said mixture in a volatile solvent and adding the resulting solution to an aqueous solution of a hydrocolloid under conditions of violent agitation and at a temperature in the neighborhood of the boiling point of water to evaporate said solvent and a portion of the water from said hydrocolloid solution.

LAURENCE E. HARRISON.